No. 691,438. Patented Jan. 21, 1902.
W. F. BROTHERS.
WEIGHING MACHINE.
(Application filed Apr. 9, 1901.)
(No Model.)
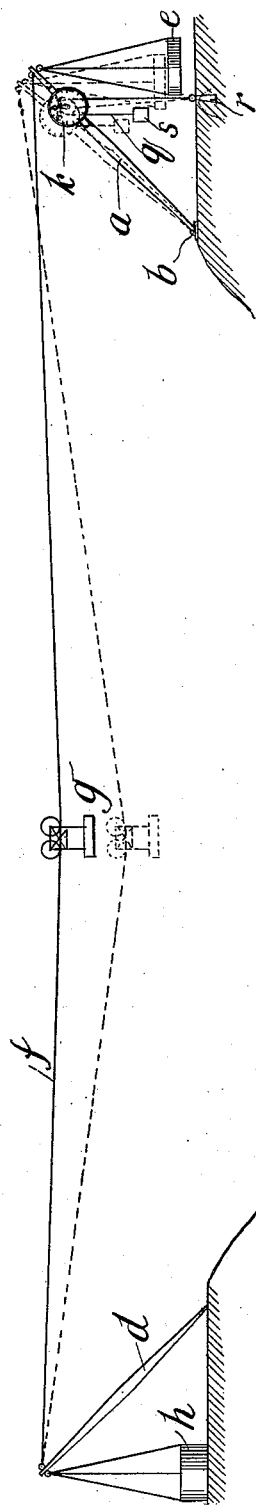
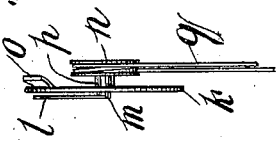
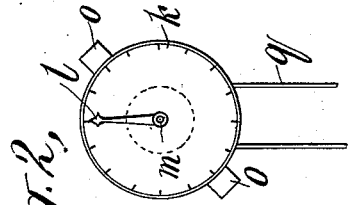
WITNESSES:
D. N. Hayward
L. N. Franklin
INVENTOR
William F. Brothers
BY
Seabury C. Mastick
his ATTORNEY.

United States Patent Office.

WILLIAM F. BROTHERS, OF BROOKLYN, NEW YORK, ASSIGNOR TO THE W. F. BROTHERS COMPANY, A CORPORATION.

WEIGHING-MACHINE.

SPECIFICATION forming part of Letters Patent No. 691,438, dated January 21, 1902.

Application filed April 9, 1901. Serial No. 54,966. (No model.)

*To all whom it may concern:*

Be it known that I, WILLIAM F. BROTHERS, a citizen of the United States, and a resident of the borough of Brooklyn, New York city, New York, have invented certain new and useful Improvements in Weighing-Machines, of which the following is a specification.

My invention relates to a weighing device operated by means of the oscillations of an inclined sheer caused by variations in the load on the cable attached to the sheer, whereby the weight of the load is automatically indicated as it passes along the cable.

In the following, with reference to the accompanying drawings, I have described a structure embodying my invention, the features thereof being more particularly pointed out hereinafter in the claims.

Figure 1 is a side elevation of a cableway system in connection with one form of my new device. Fig. 2 is a front elevation of the dial of the weighing device on a slightly-enlarged scale. Fig. 3 is a side elevation of the dial as shown in Fig. 2.

Fig. 1 shows a cableway constructed on the principles set forth in my application, Serial No. 53,593, filed March 30, 1901, $a$ and $d$ indicating A-frames or inclined sheers, $e$ and $h$ gravity-anchors, $g$ the carrier, with its load, and $f$ the cable on which the carrier travels. The gravity-anchor $h$ is heavier than the gravity-anchor $e$, and consequently acts as a fixed anchor holding the sheer $d$ in a fixed position. The anchor $e$ is suspended from sheer $a$ in such manner that it is at all times clear of the ground. The cable, sheer, and anchors are so adjusted that normally the sheers stand at an angle of about forty-five degrees. As the carrier travels from either end of the cableway toward the middle anchor $e$ rises, and as the carrier approaches either end of the cableway anchor $e$ falls, sheer $a$ oscillating or rocking on its base $b$, the upper end of the sheer passing through several degrees, the amount of oscillation, if the weight of anchor $e$ is constant, varying directly as the weight of the carrier and its load. On the sheer $a$, near the upper end, I have placed a dial $k$, having a hand $l$, keyed to a spindle $m$, having on its inner end a wheel $n$. The dial may be fastened to the sheer by means of lugs $o$ $o$, if desired, and the spindle $m$ may rest in a bearing $p$, supported in any suitable manner. A cord or wire $q$ is passed around the wheel $n$, one end being anchored firmly to the ground at $r$ and the other sustaining a weight $s$.

It is obvious that as the sheer $a$ oscillates the cord or wire $q$, by means of weight $s$ and wheel $n$, will cause the hand $l$ to move across the face of the dial. I then graduate the dial by using loads of known weight, preferably choosing some one point on the cable as the place where the weight of the load may conveniently be determined. The dial may be graduated as minutely as desired. In the drawings the graduation is shown on such a scale that the carrier without the load at the point chosen, as shown by full lines in Fig. 1, indicates zero weight. When loaded, as shown in dotted lines in Fig. 1, it causes the hand to pass over the face of the dial and indicate the weight. Whenever the load passes over the point chosen as the standard the hand on the dial indicates the weight.

It is obvious that there may be more than one point on the cable at which the weight will be indicated with equal correctness, that the dial may be placed in any convenient position on the sheer, and that the weighing device may be used in connection with other constructions of cableway than that shown in the drawings, and I do not wish to limit myself to any of the details shown.

Having described my invention, what I claim, and desire to secure by Letters Patent, is—

1. A weighing-machine comprising a suspended cable attached at one end to a fixed support and at the other end to an oscillating sheer provided with means for counterbalancing the strain of the cable, and means operated by the oscillating sheer for indicating the weight of the load on the cable.

2. A weighing-machine comprising a suspended cable attached at one end to a fixed support and at the other end to an oscillating sheer provided with means for counterbalancing the strain of the cable and means operated by the oscillating sheer for indicating the weight of the load on the cable as the load passes a predetermined point.

3. A weighing-machine comprising a suspended cable attached at one end to a fixed support and at the other end to an oscillating sheer provided with means for counterbalancing the strain of the cable and means moved by the oscillating sheer for operating a suitable device for indicating the weight of the load on the cable.

4. A weighing-machine comprising a suspended cable attached at one end to a fixed support and at the other end to an oscillating support provided with means for counterbalancing the strain of the cable, a wheel mounted on the oscillating support a cord passing around said wheel one end being secured to a fixed support and the other sustaining a weight and means operated by the wheel for indicating the weight of the load on the cable.

In witness whereof I have hereunto signed my name in the presence of two subscribing witnesses.

WILLIAM F. BROTHERS.

Witnesses:
  EDWIN C. SPRAGUE,
  SEABURY C. MASTICK.